(12) United States Patent  
Callam

(10) Patent No.: US 6,735,698 B1
(45) Date of Patent: May 11, 2004

(54) DEACTIVATING OF PORTABLE DEVICE

(75) Inventor: Susan Melanie Callam, Chandlers Ford (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/342,559

(22) Filed: Jun. 29, 1999

(30) Foreign Application Priority Data

Mar. 13, 1999 (GB) .............................................. 9905732

(51) Int. Cl.[7] .............................................. E05B 45/06
(52) U.S. Cl. ........................ 713/200; 713/184; 710/17; 710/13; 710/100; D14/384; D14/440
(58) Field of Search ................................ D14/384, 440; 710/17, 36, 100; 713/184, 200

(56) References Cited

U.S. PATENT DOCUMENTS 4,405,844 A    9/1983  Dizon et al.
4,975,550 A  * 12/1990  Panchisin ................. 200/43.08
4,993,627 A  *  2/1991  Phelan et al. ................. 235/382
5,353,350 A  * 10/1994  Unsworth et al. ............. 380/3
5,598,323 A  *  1/1997  Muller ........................ 361/726
5,870,281 A  *  2/1999  Kim ............................ 361/681

FOREIGN PATENT DOCUMENTS

GB            1449555 A        9/1976   .......... E05B/65/44

* cited by examiner

Primary Examiner—Gregory Morse
Assistant Examiner—Paul Callahan
(74) Attorney, Agent, or Firm—Edward H. Duffield; George E. Grosser

(57) ABSTRACT

A portable device has an openable cover, the cover being open in normal operation. A method is provided for automatic deactivating the portable device. When the cover is detected to be in an open position and a key operated switch is in a locked position, the portable device is deactivated. The deactivation can be by means of a fusible element or by corruption of a non-volatile storage device required for the operation of the machine, such as a hard disk storing an operating system.

5 Claims, 3 Drawing Sheets

DEACTIVATING OF PORTABLE DEVICE

FIELD OF THE INVENTION

The present invention relates to portable devices and more specifically to deterring theft of portable computers.

BACKGROUND OF THE INVENTION

As portable computers such as laptop and notebook computers have become more popular and more powerful, they have become increasingly attractive targets for theft, including in the workplace of the computer's user. Portable computers, such as the ThinkPad laptop from IBM Corporation, are designed to be easily portable and it is this characteristic which also makes them easy to steal (ThinkPad and IBM are trademarks of IBM Corporation). The main factors which make them so easy to steal is that they are relatively small and can be easily concealed in a briefcase, bag or simply carried under the arm. This results in office theft of a portable computer being much simpler than the theft of larger equipment such as personal computers.

As such thefts have become more common and more costly, an assortment of devices and systems have been proposed for securing portable computers from theft. Solutions such as password protection on BIOS, hard drive and operating system have been implemented. In a related field, items such as car radios have a security code which must be entered whenever power has been removed from the unit. This may be either because the unit has been removed from the car or because the car's battery has been removed from the car.

However, these do not provide a visual deterrent against the stealing of a portable computer. A solution which does provide a visual deterrent is to fix machines to desks but this solution detracts from the advantages of having a portable computer. Another solution which does provide a visual deterrent is the use of a keylock which has to be operated before the machine will function. Typically such a keylock temporarily disables the keyboard and/or display screen, thus preventing use of the computer. Such a solution has been in use for many years, in, for example, the 3270 range of display terminals from IBM Corporation and the PC/AT personal computer from IBM Corporation (IBM and PC/AT are trademarks of IBM Corporation). However, such a system is relatively easy to bypass so as to enable operation of the computer without the key associated with the keylock.

There is thus a need for a device as a visual deterrent against the theft of a portable computer which is not easily bypassed.

SUMMARY OF THE INVENTION

Accordingly, the present invention provides a method for automatic deactivating a portable device having an openable cover, the cover being open in normal operation, the method comprising the steps of: detecting whether the cover is in an open position; detecting whether a key operated switch is in a normal operating position or a locked position; and responsive to a determination that the cover is in an open position and that the key operated switch is in a locked position, deactivating the portable device.

The invention also provides apparatus for automatic deactivation of a portable device comprising: an openable cover, the cover being open in normal operation; means for detecting whether the cover is in an open position; a key operated switch having a normal operating position and a locked position, the cover being locked closed in said locked position; and means for deactivating the portable device, the means for deactivating being responsive to a determination that the cover is in an open position and that the key operated switch is in a locked position.

Preferably, the key operated switch operates by an interchange of electronic codes between a key and the key operated switch.

In an embodiment, the apparatus further comprises a fusible element which acts to deactivate the portable device in response to the means for deactivating the portable device.

In another embodiment, the apparatus further comprises a non-volatile memory means essential for normal operation of the portable device and means to damage the non-volatile memory means in response to the means for deactivating the portable device.

BRIEF DESCRIPTION OF THE DRAWINGS

Embodiments of the invention will now be described, by way of example, with reference to the accompanying drawings, in which.

DETAILED DESCRIPTION OF THE INVENTION

Figure 1:
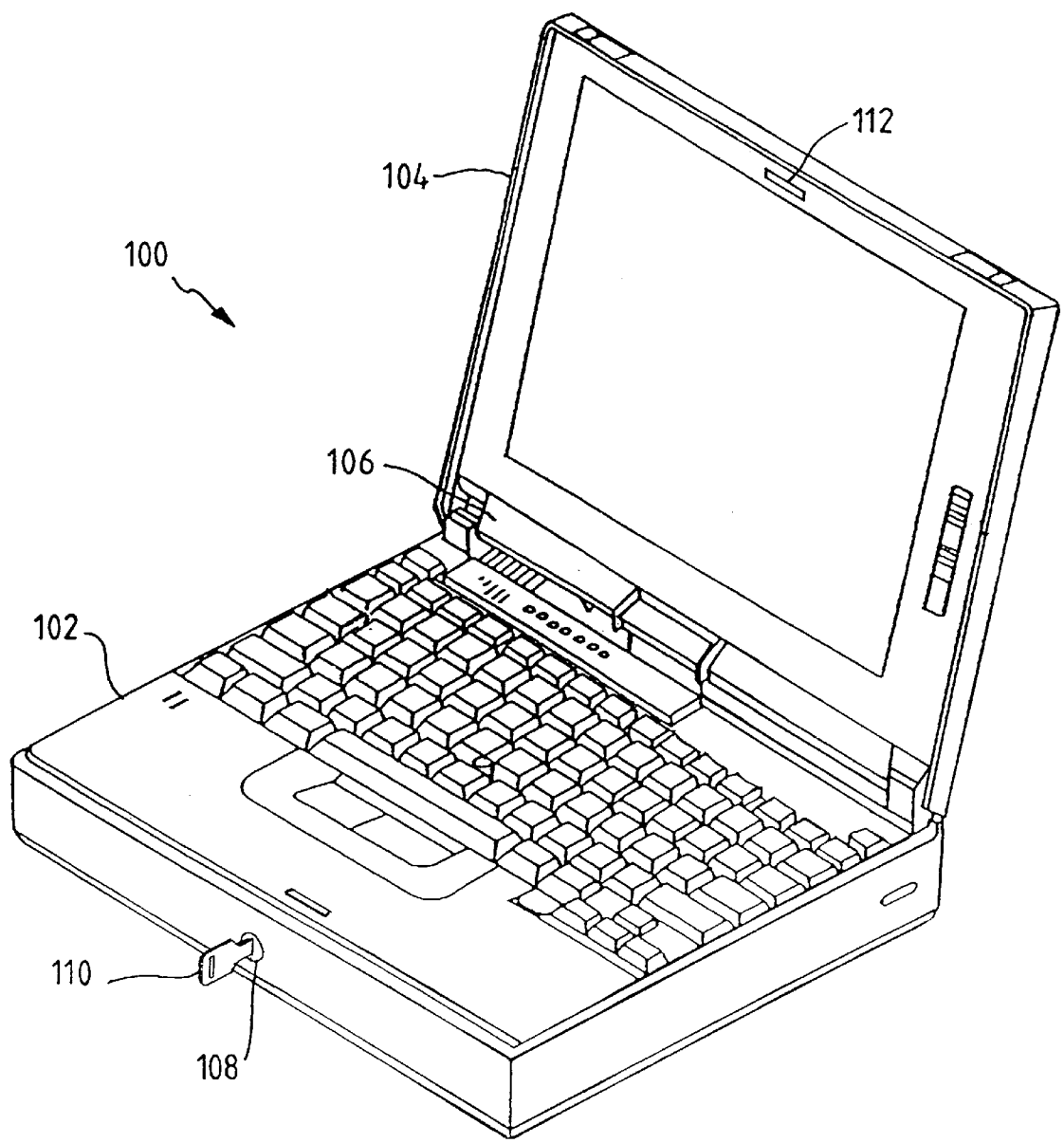
FIG. 1 is a perspective view of a portable computer incorporating a keylock according to the present invention.

FIG. 1 shows a portable electronic device such as a laptop or notebook computer 100 having a base 102 and a cover 104. The base 102 and cover 104 are rotatably connected by a hinge 106. Located in the base 102 is a lock 108 which is operated by a key 110. The lock 108 co-operates with a mechanism 112 located on the cover 104 of the portable computer 100 so as to allow the cover 104 to be opened relative to the base 102 of the computer 100 when a key 110 has been correctly inserted into the lock 108. This allows normal operation of the portable computer 100 when the cover 104 is open. The lock 108 also co-operates with the mechanism 112 so as to prevent the cover 104 from being opened relative to the base 102 of the computer 100 when no key 110 or the wrong key 110 has been inserted into the lock 108. This prevents normal operation of the portable computer 100 when the cover 104 is closed.

Figure 2:
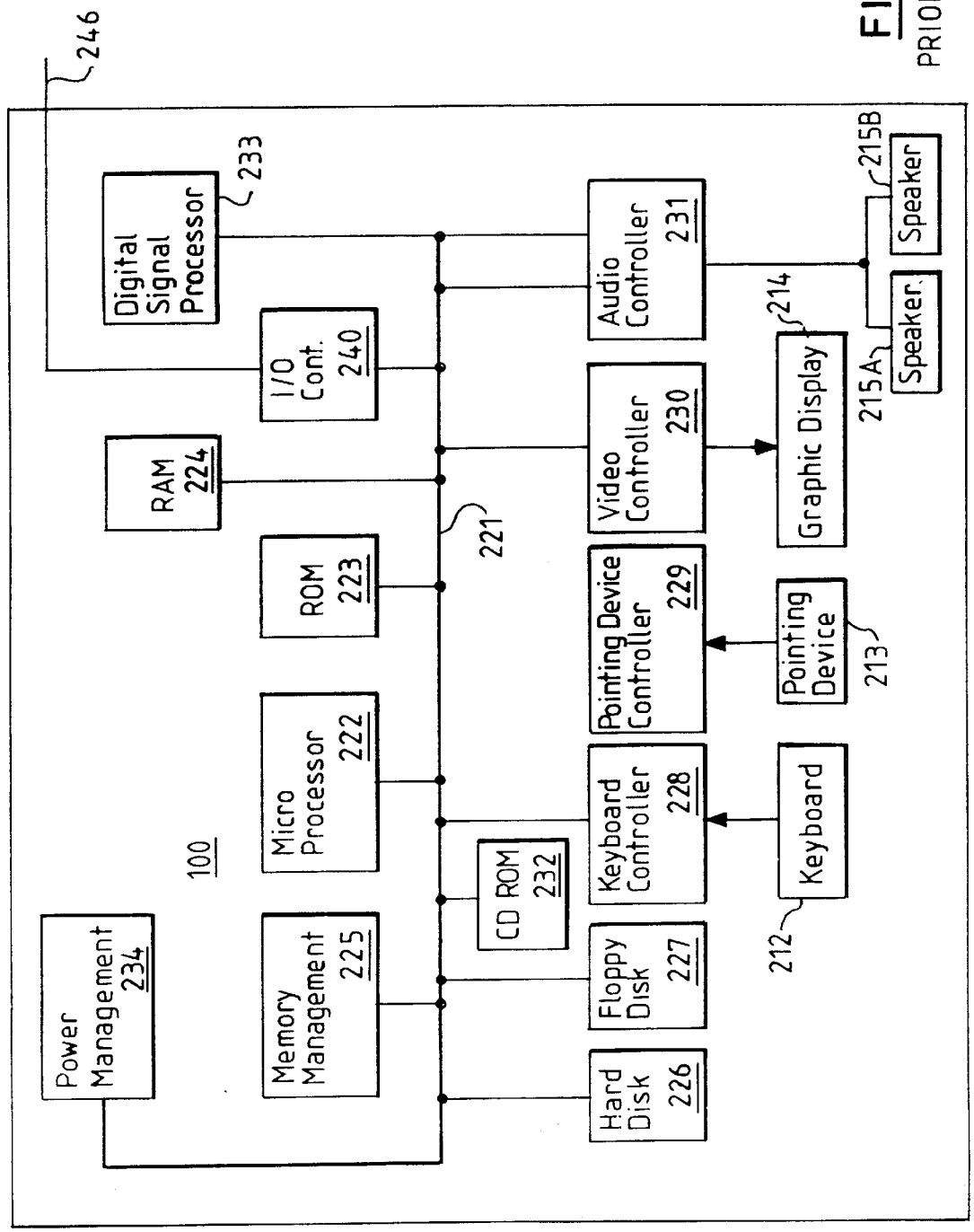
FIG. 2 is a block diagram of the portable computer of FIG. 1.

FIG. 2 shows a prior art portable computer 100, comprising a keyboard 212, a pointing device 213 and a display 214 depicted in block diagram form. The portable computer 100 includes a system bus or plurality of system buses 221 to which various components are coupled and by which communication between the various components is accomplished. The microprocessor 222 is connected to the system bus 221 and is supported by read only memory (ROM) 223 and random access memory (RAM) 224 also connected to system bus 221. In many typical computers the microprocessors including the 386, 486 or Pentium microprocessors (Intel and Pentium are trademarks of Intel Corp.). However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 223 contains among other code the Basic Input-Output System (BIOS) which controls basic hardware operations such as the interaction between the CPU and the disk drives and the keyboard. The RAM 224 is the main memory into which the operating system and application programs are loaded. The memory management chip 225 is connected to the system bus 221 and controls direct memory access operations including, passing data between the RAM 224 and hard disk drive 226 and floppy disk drive 227. The CD ROM 232 also coupled to the system 221 is used to store a large amount of data, e.g. a multimedia program or presentation. CD ROM 232 may be an external CD ROM connected through an adapter card or it may be an internal CD ROM having direct connection to the motherboard.

Also connected to this system bus 221 are various I/O controllers: the keyboard controller 228, the pointing device controller 229, the video controller 230 and the audio controller 231. As might be expected, the keyboard controller 228 provides the hardware interface for the keyboard 212, the pointing device controller 229 provides the hardware interface for pointing device 213, the video controller 230 is the hardware interface for the display 214, and the audio controller 231 is the hardware interface for the speakers 215a and 215b. The power management controller 234 is connected to the system bus and receives power from a battery or from an external power supply which converts the ac voltage from a building supply to a predetermined lower dc voltage used to operate the portable computer 100. An I/O controller 240 such as a Token Ring adapter card enables communication over a network 246 to other similarly configured data processor systems. These I/O controllers may be located on the motherboard within the portable computer or they may be located on adapter cards or cartridges which plug into the motherboard. The adapter cards may communicate with the motherboard using a PCI interface, an ISA or EISA interface or other interfaces.

Referring to FIG. 1, the lock 108, in addition to co-operating with mechanism 112 to physically prevent the cover 104 being opened relative to the base 102 of the computer 100, incorporates a keylock microswitch so that the state of the lock can be determined by the computer 100.

Figure 3:
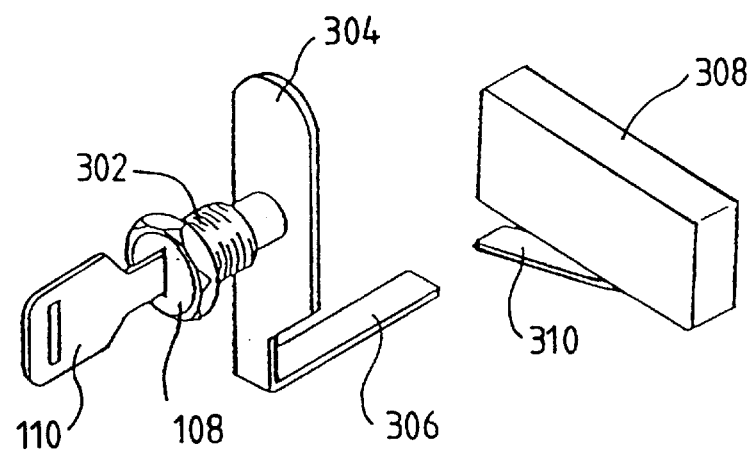
FIG. 3 is a perspective view showing the construction of a keylock mechanism in a first key position.

Referring to FIG. 3, the lock mechanism comprises a key 110, a key hole 108, a cylinder 302 and a bracket 304. The position of the bracket 304 can be changed by rotating the key 110, but the relative orientation of the bracket 304 and the key 110 are always the same. The key 110 may operate the cylinder 302 mechanically or it may operate the cylinder 302 by the interchange of electronic codes between the key 110 and the cylinder 302. The lock mechanism of FIG. 3 is shown in a first position. In the first position, the cover 104 may be opened relative to the base 102 and the computer 100 operates normally.

Figure 4:
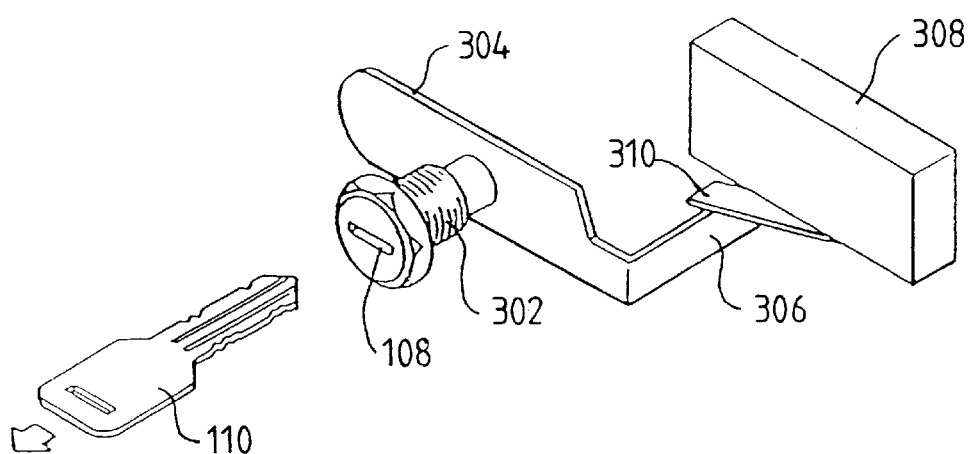
FIG. 4 is a perspective view showing the construction of a keylock mechanism in a second key position.

FIG. 4 shows the lock of FIG. 3 in a second position. In the second position, the cover 104 is locked relative to the base 102 and the computer 100 does not operate normally. In the second position, a extended portion 306 provided on one end of the bracket 304 contacts a switch terminal 310 of the keylock microswitch, thus providing an indication as to whether a correct key 110 has been inserted and the lock mechanism operated correctly. The lock mechanism should not be capable of being moved from a normal operating position to a locked position whilst the cover is open, otherwise inadvertent operation of the deactivating mechanism will occur. In a variation of the present invention, the meanings of the first position being a normal operating position and the second position being a locked position may be reversed and the microswitch activated in an unlocked position, rather than in the locked position.

Mechanism (112 in FIG. 1) includes a switch which indicates whether the cover 104 is open or whether the cover 104 is closed. In the circumstances that the keylock microswitch 308 detects that the correct key has not been inserted and the lock mechanism has not been operated correctly AND that the mechanism (112 in FIG. 1) indicates that the cover is open, then in accordance with the present invention, the portable computer is disabled either permanently or semi-permanently. These circumstances could arise if a wrong key was inserted and the lock forced or if the cover 104 of the portable computer 100 was prised open without the use of a key. Such a method of opening is likely to be used if the unit was stolen.

The portable computer 100 may be disabled either permanently or semi-permanently in a number of different ways. Each of the different ways is intended to disable the portable computer 100 in such a manner that re-enablement of the computer is either not possible at all or is only possible if the computer is taken to a service centre or the like. In a first embodiment, a fuse in the power management circuit (234 in FIG. 2) may be forced to be blown by having a circuit operated that causes excessive current to flow through the fuse. The fuse should not be user-replaceable, but should be either not replaceable or service centre only replaceable. In a second embodiment, the fixed disk drive 226 may be caused to be corrupted so as to be unusable. Preferably, such corruption should not be such that it is possible to easily recover from the corruption by, for example, reformatting the hard disk. Alternatively, if the protection of the information stored on the hard disk is of primary consideration and the value of the machine itself is of secondary consideration, then reformatting the hard disk to restore the machine may be allowed. In this situation, protection against disclosure of the information stored on the hard disk of the computer is obtained. Corruption of the hard disk may be achieved by, for example, over-writing the control areas of the disk, such as for example, the File Allocation Table or Tables.

The invention described above means that the computer is not operable without the use of the correct key and if there is an indication of this placed on the outside of the computer, then a deterrent against theft is provided.

What is claimed is:

1. A method for automatic deactivation of a portable, computing device having a cover, that is moveable between an open position in which a display is visible and closed position in which the display is out of view, and a lock that blocks movement of the cover from closed to open position when it is in a locked position and allows such movement when in an operating position, the cover being open in normal device operation, the method comprising the steps of:

detecting whether the cover is in the open position;

detecting whether a key operated switch is in a normal operating position or a locked position; and responsive to a determination that the cover is in an open position and that the key operated switch is in a locked position, deactivating the portable computing device whereby the device is secured if unauthorized forced opening occurs.

2. Apparatus for automatic deactivation of a portable device comprising:

an openable cover, the cover being open in normal operation;

means for detecting whether the cover is in an open position;

a key operated switch having a normal operating position and a locked position, the cover being locked closed in said locked position; and means for deactivating the portable device, the means for deactivating being responsive to a determination that the cover is in an open position and that the key operated switch is in a locked position.

3. Apparatus as claimed in claim 2, wherein the key operated switch operates by an interchange of electronic codes between a key and the key operated switch.

4. Apparatus as claimed in claim 2, further comprising a fusible element which acts to permanently deactivate the portable device in response to the means for deactivating the portable device.

5. Apparatus as claimed in claim 2, further comprising a non-volatile memory means essential for normal operation of the portable device and means to damage the non-volatile memory means in response to the means for deactivating the portable device.

* * * * *